P. H. CASEY.
SHOCK BINDER.
APPLICATION FILED DEC. 20, 1913.
1,117,788.
Patented Nov. 17, 1914.
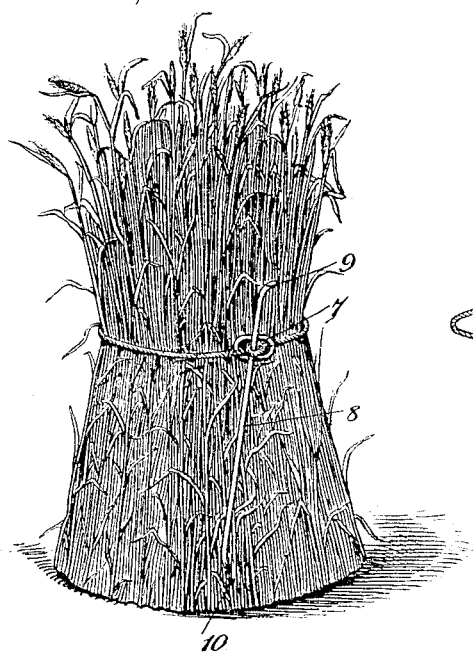
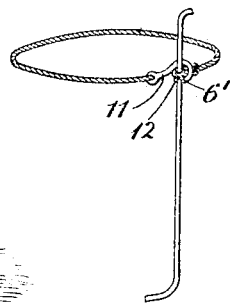
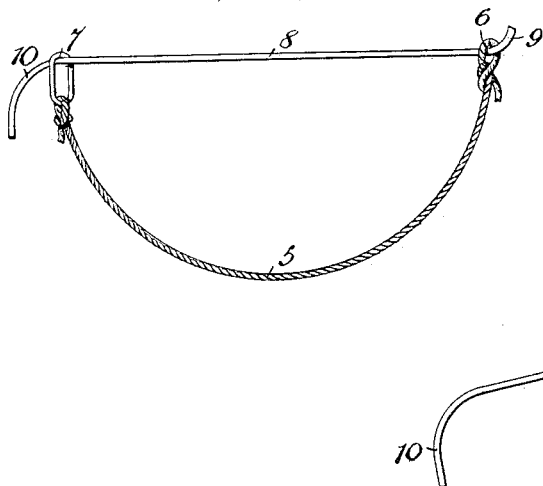
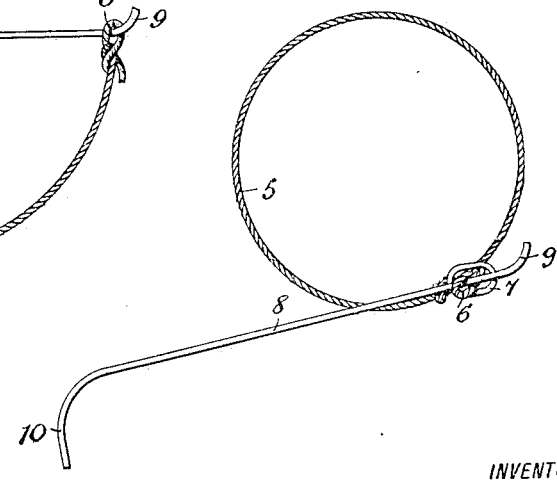
WITNESSES
INVENTOR
Patrick H. Casey
BY
ATTORNEYS

UNITED STATES PATENT OFFICE.

PATRICK H. CASEY, OF ERIN, WISCONSIN.

SHOCK-BINDER.

1,117,788.  Specification of Letters Patent.  Patented Nov. 17, 1914.

Application filed December 20, 1913. Serial No. 807,900.

*To all whom it may concern:*

Be it known that I, PATRICK H. CASEY, a citizen of the United States, and a resident of Erin, in the county of St. Croix and State of Wisconsin, have invented a new and Improved Shock-Binder, of which the following is a full, clear, and exact description.

My invention relates to shock binders, and the object thereof is to provide a simple and inexpensive device whereby a shock of grain can be quickly and easily tied or untied; and when the shock is tied by means of my device the device cannot loosen itself accidentally, that is, when the shock is handled as is customary.

I attain the above object by providing a flexible member having loops at the extremities and a rod adapted to engage the loops of the flexible member, whereby one of the loops can be forced through the other loop and maintained there by said rod.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is an elevation of a shock of grain tied by means of my device; Fig. 2 is a plan view of the device showing the flexible member; Fig. 3 is a similar view showing the device in process of binding a shock; and Fig. 4 is a perspective view of a modification of the device when the same is in a locked condition.

Referring to the drawings, 5 represents a flexible member, preferably a rope of suitable length, having at one end loop 6 formed by the rope and at the opposite end another loop, preferably in the shape of a metallic link, 7 carried by the member 5. Engaging the loop 6 and the link 7 is a rod 8 bent at its ends in opposite directions. The bend 9 forming the upper end of the rod is shorter than the bend 10 forming the handle of the rod and its lower end.

When a shock is to be bound by means of the device, the end 9 of the rod is made to engage the loop 6 and the end 10 to link 7, as shown in Fig. 2. The device is made to encircle the shock with the loop 9 drawn toward the link 7 by means of the end 9 of the rod until the loop 6 is drawn through the link 7, then the rod 8 is forced so that the end 9 of the rod moves slightly away from the loop 6, then the rod 8 is turned so as to lie transversely of the link 7, thereby forming the flexible member 5 into a ring about the shock, with the end 10 of the rod 8 forced between the stems, and thereby the same is prevented from accidental displacement when the shock is handled; and even if the rod should be accidentally displaced, the pulling of the flexible member can under no circumstances force the rod 8 through the link so as to permit the loop 6 to pass through the link 7.

In the modified form, as shown in Fig. 4, in place of a link a hook 11 is provided, in which case the results obtained, as can be seen, are substantially the same. It is understood that the end 12 of the hook is bent far enough to form a deep hook, whereby the rod 8 cannot by a slight displacement pass the end 12 and permit the loop 6' to disengage itself.

To untie the shock of grain, the rod 8 is pulled so that the end 9 is brought toward the loop 6, where, by a slight turn, the said end is made to pass through the link 7 and therewith the loop, thereby untying the shock.

Having thus described my invention, I claim as new and desire to secure by Letters Patent:

1. In a device of the class described, a flexible member having a loop at one end and a link at the other end; and a rod having bent ends adapted to engage said loop and link whereby the loop is adapted to be pulled through the link by said rod to form said flexible member into a ring, said rod being adapted to be placed transversely of the link, preventing the pulling out of said loop through the link.

2. In a device of the class described, a flexible member having a loop at one end and a rigid member at the other end; and a rod having bent ends adapted to engage said loop and rigid member whereby the loop is adapted to engage said rigid member to form said flexible member into a ring, said rod locking said loop to said rigid member thereby maintaining said flexible member in ring form.

In testimony whereof I have signed my name to this specification in the presence of two subscribing witnesses.

PATRICK H. CASEY.

Witnesses:
J. E. HUGHES,
WM. HUGHES.

Copies of this patent may be obtained for five cents each, by addressing the "Commissioner of Patents, Washington, D. C."